United States Patent
Kim et al.

(10) Patent No.: US 10,428,219 B2
(45) Date of Patent: Oct. 1, 2019

(54) DYE AND DYE COMPOSITION

(71) Applicant: SAMSUNG DISPLAY CO., LTD., Yongin-Si, Gyeonggi-Do (KR)

(72) Inventors: Hyun Jin Kim, Suwon-Si (KR); Su Jeong Kim, Yongin-Si (KR); Dae Won Lee, Asan-Si (KR); Myung Jin Lee, Hwaseong-Si (KR); Chul Huh, Yongin-Si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 191 days.

(21) Appl. No.: 15/446,760

(22) Filed: Mar. 1, 2017

(65) Prior Publication Data

US 2017/0253741 A1 Sep. 7, 2017

(30) Foreign Application Priority Data

Mar. 2, 2016 (KR) .......................... 10-2016-0025320

(51) Int. Cl.
*C09B 47/04* (2006.01)
*C09B 47/10* (2006.01)
*G02B 5/22* (2006.01)

(52) U.S. Cl.
CPC .............. *C09B 47/04* (2013.01); *C09B 47/10* (2013.01); *G02B 5/223* (2013.01)

(58) Field of Classification Search
CPC .......... C09B 47/04; C09B 47/10; G02B 5/223
See application file for complete search history.

(56) References Cited

U.S. PATENT DOCUMENTS

| 5,712,332 A * | 1/1998 | Kaieda ................ C08K 5/0091 428/500 |
| 2012/0205599 A1 | 8/2012 | Matsumoto et al. |
| 2016/0004124 A1 | 1/2016 | Benoit et al. |

FOREIGN PATENT DOCUMENTS

| JP | 2003-128949 | 5/2003 |
| KR | 1020120059513 | 6/2012 |

(Continued)

OTHER PUBLICATIONS

STIC Search Report dated Nov. 2, 2018.*

*Primary Examiner* — Eisa B Elhilo
(74) *Attorney, Agent, or Firm* — F. Chau & Associates, LLC

(57) ABSTRACT

A dye according to an exemplary embodiment of the present invention includes a compound represented by the following Chemical Formula 1.

(Continued)

[Chemical Formula 1]

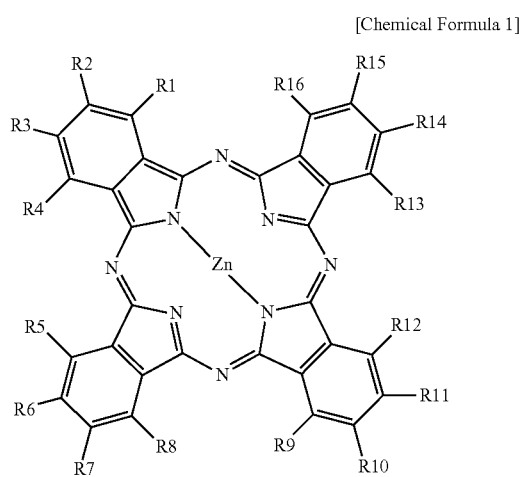

In Chemical Formula 1, R1, R4, R5, R8, R9, R12, R13, and R16 are each independently Br or Cl, R2, R3, R6, R7, R10, R11, R14, and R15 are each independently any one of a group including Br, Cl, and a hydroxyl group, a group including an —N(H)n group, and a group including an —SH group, n is 1 to 3, and at least one of the R2, R3, R6, R7, R10, R11, R14, and R15 is any one of a group including a hydroxyl group, a group including an —N(II)n group, and a group including an —SH group.

17 Claims, 12 Drawing Sheets

(56) References Cited

FOREIGN PATENT DOCUMENTS

| | | |
|---|---|---|
| KR | 1020140074624 | 6/2014 |
| KR | 1020140079687 | 6/2014 |
| KR | 1020150116443 | 10/2015 |
| WO | 2014/123724 | 8/2014 |

\* cited by examiner

DYE AND DYE COMPOSITION

CROSS-REFERENCE TO RELATED APPLICATION

This application claims priority under 35 U.S.C. § 119 to Korean Patent Application No. 10-2016-0025320 filed in the Korean Intellectual Property Office on Mar. 2, 2016, the entire contents of which are incorporated by reference herein.

TECHNICAL FIELD

The present invention relates to a dye and a dye composition including the same.

DISCUSSION OF RELATED ART

A liquid crystal display device is one of display devices, and typically includes a lower display panel, an upper display panel, and a liquid crystal layer disposed between the lower display panel and the upper display panel. To display an image, a voltage is applied between the pixel electrode and the common electrode of the liquid crystal display device to generate an electric field, thereby changing the arrangement of the liquid crystal molecules in the liquid crystal layer to control the polarization of incident light.

Color filters are formed on one side of the display panel of the liquid crystal display device. Light passing through the liquid crystal layer passes through each of the color filters to display a color, and an image is displayed by a combination of these colors. Accordingly, it is important to adjust the color of the color filter to display the color of the image clearly and abundantly. Further, to realize a high-quality image, the dye used in the manufacture of the color filter should have high color purity.

SUMMARY

The present invention provides a dye and a dye composition capable of exhibiting green with high purity.

An exemplary embodiment of the present invention provides a dye including a compound represented by the following Chemical Formula 1.

[Chemical Formula 1]

In Chemical Formula 1, R1, R4, R5, R8, R9, R12, R13, and R16 are each independently Br or Cl, R2, R3, R6, R7, R10, R11, R14, and R15 are each independently any one of a group including Br, Cl, and a hydroxyl group, a group including an —N(H)n group, and a group including an —SH group, n is 1 to 3, at least one of the R2, R3, R6, R7, R10, R11, R14, and R15 is any one of a group including a hydroxyl group, a group including a —N(H)n group, and a group including an —SH group.

The group including a hydroxyl group may include ethylene glycol and polyvinyl alcohol.

The compound of Chemical Formula 1 may include a compound represented by the following Chemical Formula 1-1.

[Chemical Formula 1-1]

The compound of Chemical Formula 1 may include a compound represented by the following Chemical Formula 1-2.

[Chemical Formula 1-2]

A dye composition according to an exemplary embodiment of the present invention may include a dye including a compound represented by the following Chemical Formula 1, a yellow dye or pigment, and a cyan dye or pigment.

[Chemical Formula 1]

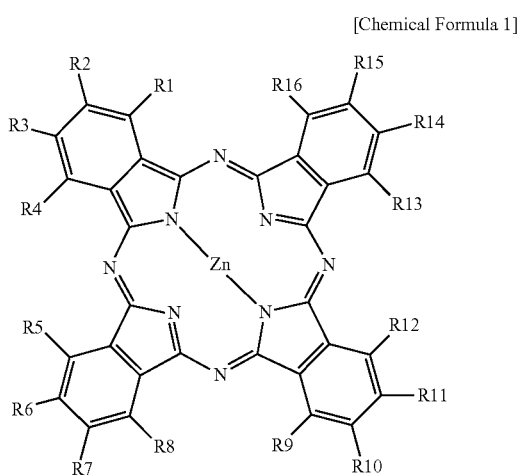

In Chemical Formula 1, R1, R4, R5, R8, R9, R12, R13, and R16 are each independently Br or Cl, R2, R3, R6, R7, R10, R11, R14, and R15 are each independently any one of a group including Br, Cl, and a hydroxyl group, a group including a —N(H)n group, and a group including an —SH group, n is 1 to 3, at least one of the R2, R3, R6, R7, R10, R11, R14, and R15 is any one of a group including a hydroxyl group, a group including a —N(H)n group, and a group including an —SH group.

A content of the yellow dye may be about 5 wt % to 15 wt %, a content of the cyan dye may be about 0.2 wt % to 1 wt %, and the dye including the compound represented by Chemical Formula 1 may be included in the dye composition so that total content of the dye composition is 100 wt %.

The dye composition may have a transmittance central wavelength of about 530 nm and a full width at half maximum (FWHM) of about 100 nm.

The group including a hydroxyl group may include ethylene glycol and polyvinyl alcohol.

The compound of Chemical Formula 1 may include a compound represented by the following Chemical Formula 1-1.

[Chemical Formula 1-1]

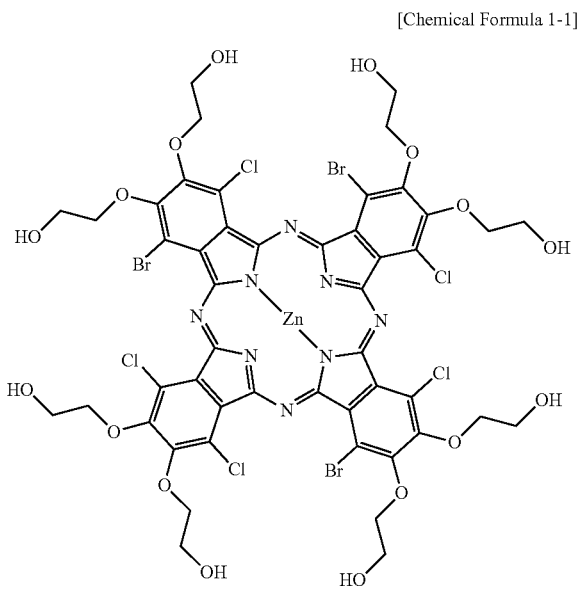

The compound of Chemical Formula 1 may include a compound represented by the following Chemical Formula 1-2.

[Chemical Formula 1-2]

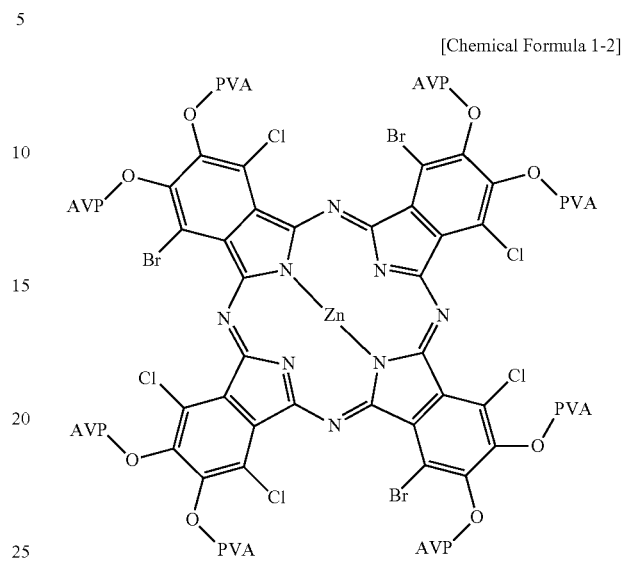

The cyan dye may have an absorption central wavelength of about 635 nm to 665 nm.

The yellow dye may have transmittance of less than 1% for a wavelength of about 460 nm or less.

The dye composition may have transmittance of less than 1% for a wavelength of about 600 nm or greater.

The dye composition may have transmittance of less than 1% for a wavelength of about 440 nm or less.

An exemplary embodiment of the present invention provides a dye composition for a color filter of a display device including a compound represented by the following Chemical Formula 1A.

[Chemical Formula 1A]

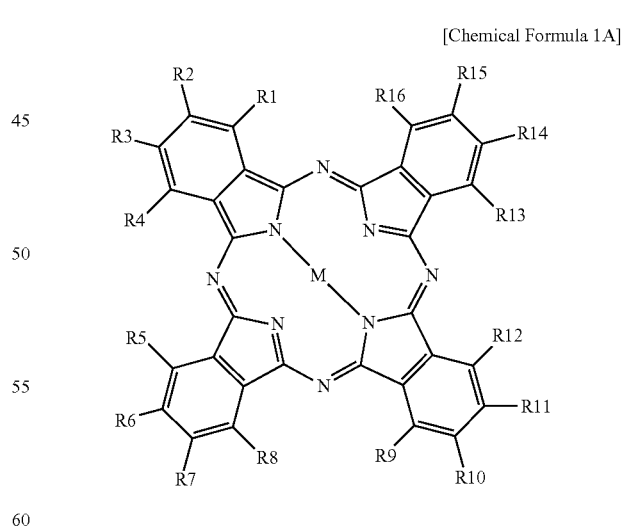

In Chemical Formula 1A, R1, R4, R5, R8, R9, R12, R13, and R16 are each independently Br or Cl, R2, R3, R6, R7, R10, R11, R14, and R15 are each independently any one of a group including Br, Cl, and a hydroxyl group, a group including an —NH$_2$ group, an —NH— group, and an =NH group, and a group including an —SH group, at least one of the R2, R3, R6, R7, R10, R11, R14, and R15 is any one of a group including a hydroxyl group, a group including an —NH₂ group, an —NH— group, and an =NH group, and a group including an —SH group, and M is one of Fe, Co, Ni, Cu, Zn, and Mg.

The group including a hydroxyl group may include ethylene glycol and polyvinyl alcohol.

The compound of Chemical Formula 1A may include a compound represented by the following Chemical Formula 1A-1.

[Chemical Formula 1A-1]

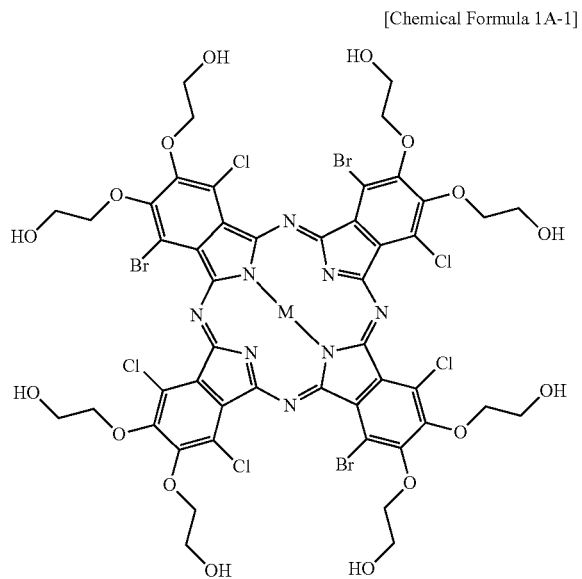

The compound of Chemical Formula 1A may include a compound represented by the following Chemical Formula 1A-2.

[Chemical Formula 1A-2]

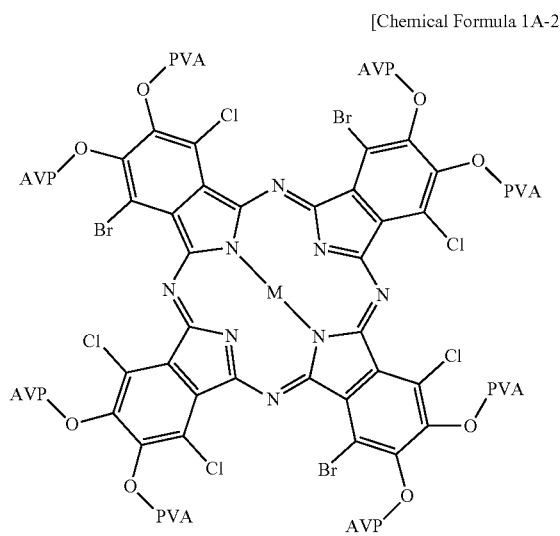

The dye composition may further include a yellow dye having transmittance of less than 1% for a wavelength of about 460 nm or less.

The dye composition may further include a cyan dye having an absorption in a range from about 635 nm to about 665 nm.

As described above, the dye and the dye composition according to an exemplary embodiment of the present invention exhibit green with high purity, and can maintain high transmittance.

BRIEF DESCRIPTION OF THE DRAWINGS

The accompanying drawings are included to provide a further understanding of the present invention, and, together with the description, serve to explain principles of the present invention, in which.

DETAILED DESCRIPTION OF THE EMBODIMENTS

Figure 1:
FIG. 1 shows a solid state of a G58 pigment before reaction.

The present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Now, the dye and the dye composition including the same according to an exemplary embodiment of the present invention will be described.

The dye according to an exemplary embodiment of the present invention includes a compound represented by the following Chemical Formula 1.

[Chemical Formula 1]

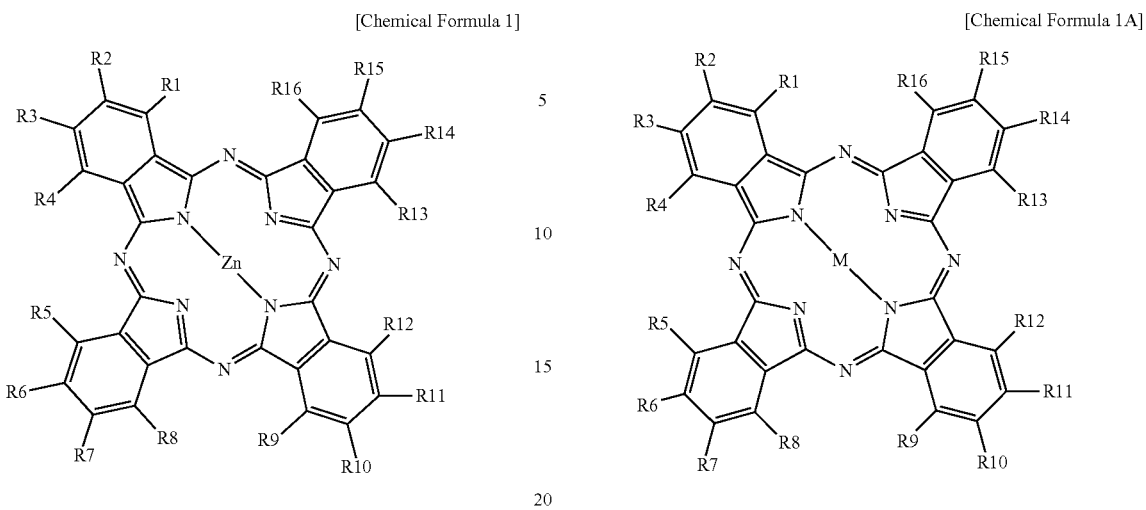

[Chemical Formula 1A]

In Chemical Formula 1, R1, R4, R5, R8, R9, R12, R13, and R16 are each independently Br or Cl, R2, R3, R6, R7, R10, R11, R14, and R15 are each independently any one of a group including Br, Cl, and a hydroxyl group, a group including an —N(H)$_n$ group, and a group including an —SH group, n is 1 to 3, and at least one of the R2, R3, R6, R7, R10, R11, R14, and R15 is any one of a group including a hydroxyl group, a group including an —N(H)$_n$ group, and a group including an —SH group.

In the dye according to an exemplary embodiment of the present invention, some or all of the R2, R3, R6, R7, R10, R11, R14, and R15 are modified by a group including a hydroxyl group, a group including an —N(H)$_n$ group, or a group including an —SH group. In this case, in the present exemplary embodiment, it is most preferred that all of the R2, R3, R6, R7, R10, R11, R14, and R15 are modified, but a partially modified dye is also included as an exemplary embodiment of the present invention. The original R2, R3, R6, R7, R10, R11, R14, and R15 before modification may be hydrogen, Br or Cl. The group including a hydroxyl group may include hydroxyalkyl, hydroxyaryl, and a polymer having pendent hydroxyl groups, in addition to the —OH group not linked to any structure. The alkyl, the aryl and the polymer linked to the hydroxyl group may further include hetero atoms such as, for example, O, N, and S. For example, the alkyl group may include O to become an alkoxy group and/or an ether group. Similarly, the group including an —N(H)$_n$ group or the group including an —SH group may include the —N(H)$_n$ group or the —SH group linked to an alkyl group, an aryl group, and a polymer, in addition to not linked to any other structure.

Chemical Formula 1 is a metal phthalocyanine with both peripheral (β-site) and non-peripheral (α-site) hydrogens being substituted. Phthalocyanines are macrocyclic pigments, and have four pyrrole-like subunits linked to form a 16-membered ring. The pyrrole-like structure is an isoindole structure. Thus, each of the four subunits may include an isoindole structure and a nitrogen linking to a neighboring isoindole structure, and may share a metal located in the middle of the 16-membered ring. The metal of the metal phthalocyanine may include one of various metals such as, for example, Fe, Co, Ni, Cu, Zn, and Mg.

The dye according to an exemplary embodiment of the present invention may include a compound represented by the following Chemical Formula 1A.

In Chemical Formula 1A, R1 to R16 are as defined in Chemical Formula 1. M is one of Fe, Co, Ni, Cu, Zn, and Mg. The —N(H)$_n$ group described above for Chemical Formula 1 may include, for example, one of an —NH$_2$ group, an —NH— group, and an =NH group, as well as protonated —N$^+$H$_3$, —N$^+$H$_2$—, and =N$^+$H$_2$— groups.

The group including a hydroxyl group may include ethylene glycol and polyvinyl alcohol. In this case, the linkage to the phthalocyanine structure is through the elimination of a hydrogen of one of the hydroxyl groups of the above materials. For example, the substituent representing ethylene glycol is hydroxyethoxy group.

The compound of Chemical Formula 1 is modified by appropriately reacting a G58 pigment. The G58 pigment is the compound represented by the following Chemical Formula 2, and is commercially available.

[Chemical Formula 2]

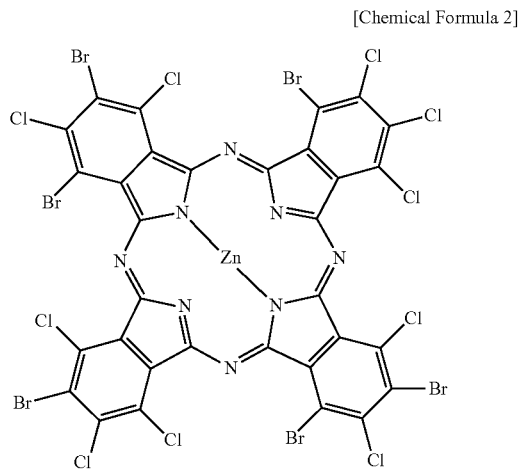

The compound of Chemical Formula 1 according to an exemplary embodiment of the present invention is obtained by substituting some of halogen elements of the G58 pigment with a hydroxyl group, an —N(H)$_n$ group, or an —SH group, such that the G58 pigment becomes a blue-green dye.

Pigments are not soluble in organic solvents, but dyes are soluble in organic solvents Through the modification, the G58 pigment turns into a dye capable of displaying green with high color purity. Such a dye that is well-soluble in an organic solvent can be easily applied to a color filter of a liquid crystal display device.

The compound of Chemical Formula 1 may be a compound represented by the following Chemical Formula 1-1 or a compound represented by the following Chemical Formula 1-2.

[Chemical Formula 1-1]

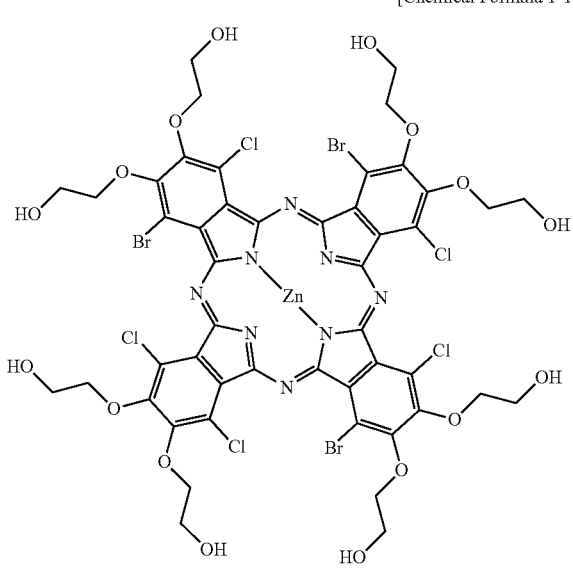

[Chemical Formula 1-2]

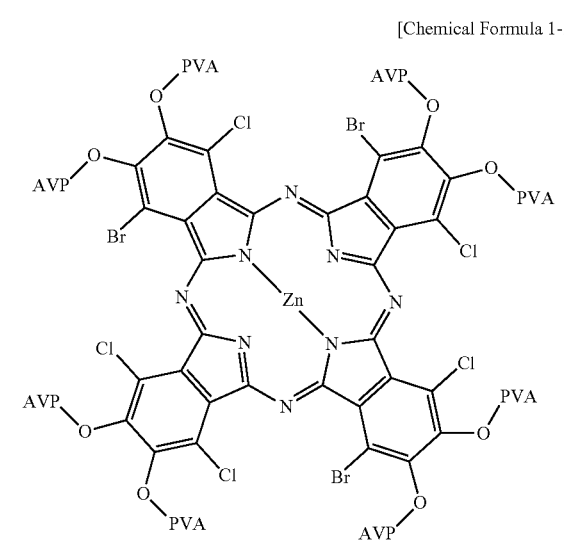

The above described dyes represented by Chemical Formula 1-1 and Chemical Formula 1-2 may include other metals besides Zn. In an exemplary embodiment of the present invention, the compound of Chemical Formula 1A may be a compound represented by the following Chemical Formula 1A-1 or a compound represented by the following Chemical Formula 1A-2.

[Chemical Formula 1A-1]

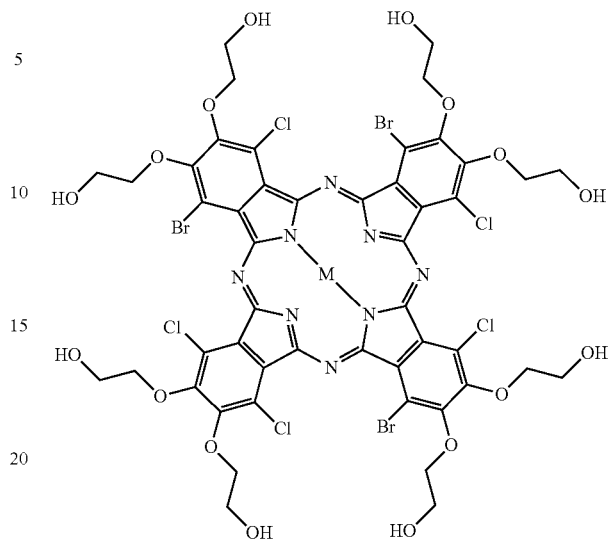

[Chemical Formula 1A-2]

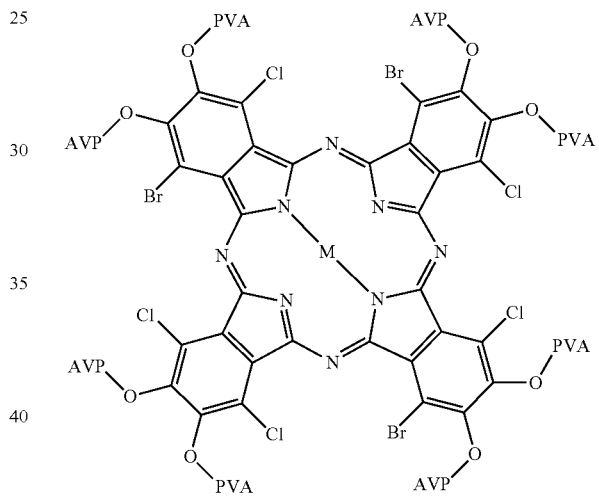

In Chemical Formulae 1A-1 and 1A-2, M is one of Fe, Co, Ni, Cu, Zn, and Mg as defined in Chemical Formula 1A.

The modification of the G58 pigment is performed by the following method. A method for preparing the compound represented by Chemical Formula 1-1 and the compound represented by Chemical Formula 1-2 will be exemplarily described, but it is apparent that a compound having another structure included in Chemical Formula 1 can also be prepared by a similar method.

Experimental Example 1: Preparing a Compound of Chemical Formula 1-1

Anhydrous potassium carbonate (2.1 eq.) and ethylene glycol (2.5 eq.) were added to a 50 mL round-bottomed flask and stirred for 10 min with a G58 pigment (1.0 eq., based on the subunit) in 50° C. DMSO (5 mL), and then further stirred for 10 min. After confirming that the green particles of the G58 pigment were uniformly dispersed throughout the solution, the reaction proceeded at 110° C. under a $N_2$ atmosphere. As the reaction progressed, the particles changed from a green color to a blue-green color. The solution was stirred overnight to sufficiently substitute the β-site (peripheral position) substituent of the G58 pigment with ethylene glycol. The unreacted G58 pigment was removed through a filter, and water and ethyl ether were added thereto so that an ethylene glycol-bound G58 dye was extracted by the organic solvent.

The water was removed with anhydrous magnesium sulfate, and the solvent was removed by a rotary evaporator to obtain a blue-green color solid.

The chemical equation for the reaction carried out to prepare the compound of Chemical Formula 1-1 according to Experimental Example 1 is as follows.

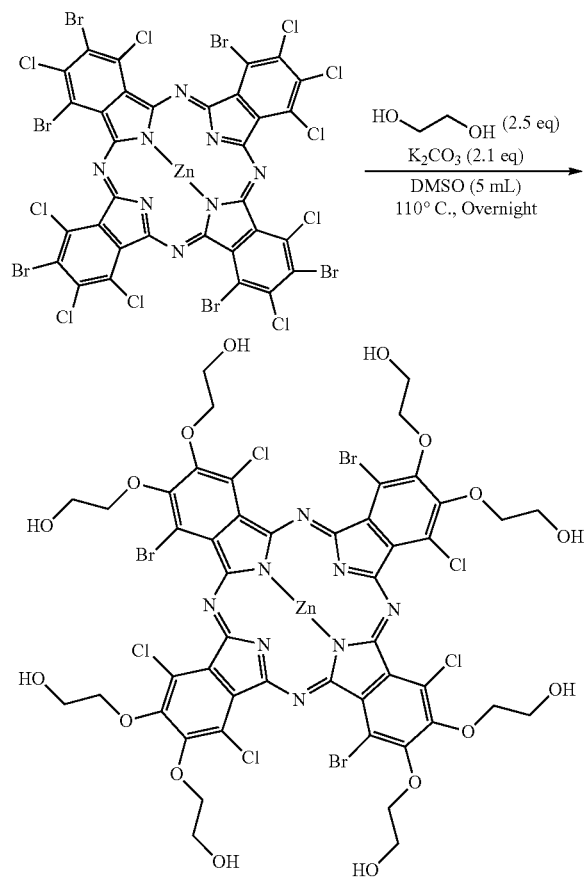

Figure 2:
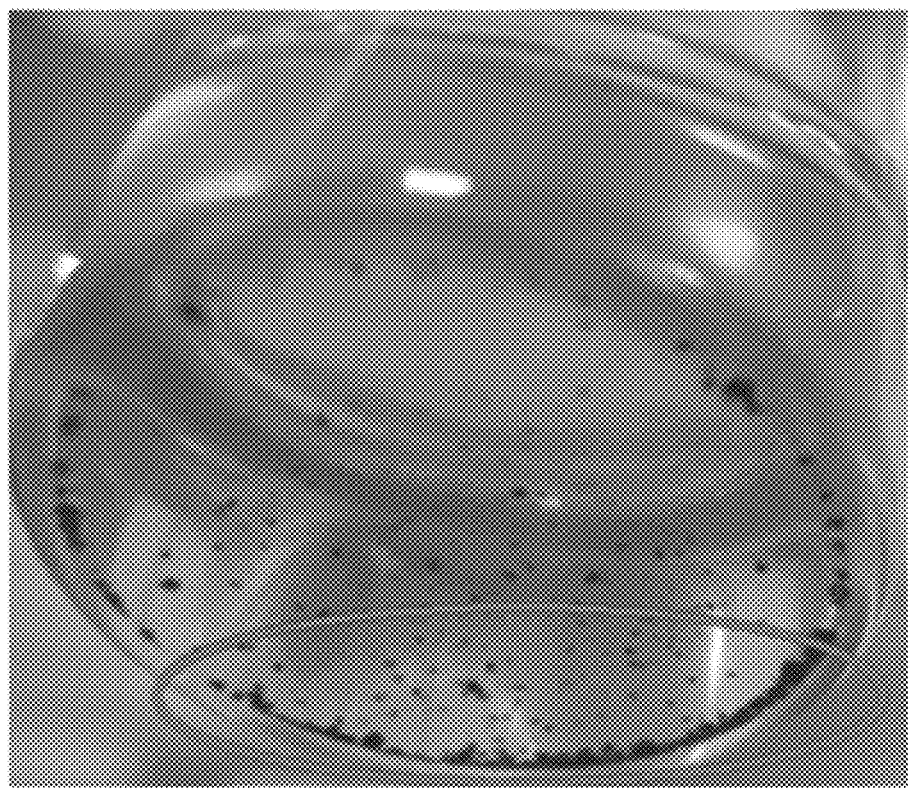
FIG. 2 is an image of a state in which a G58 pigment is dissolved in DMSO (dimethyl sulfoxide) before reaction.
Figure 3:
FIG. 3 shows a solid state of a compound of Chemical Formula 1-1 according to an exemplary embodiment of the present invention.
Figure 4:
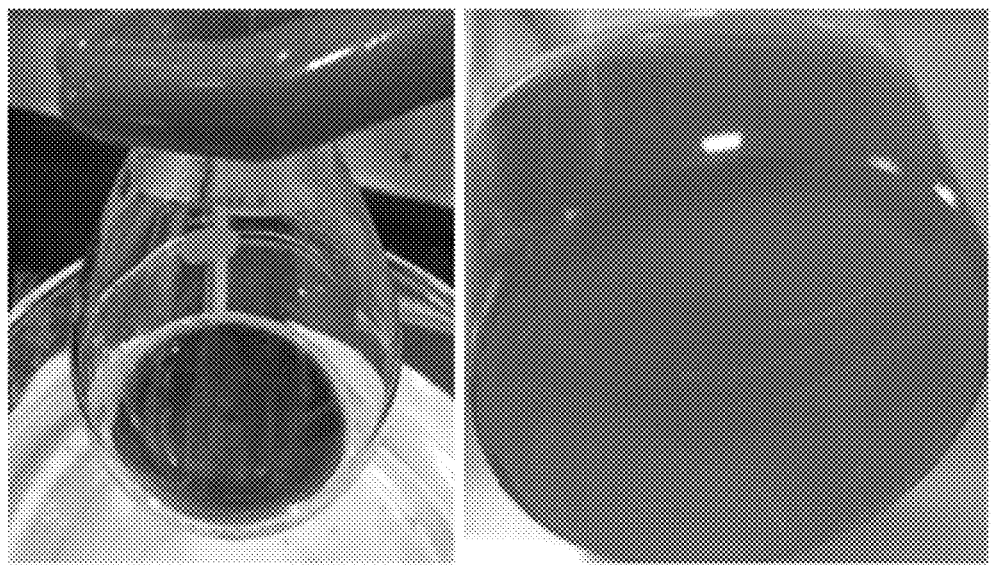
FIG. 4 is an image of a state in which a compound of Chemical Formula 1-1 is dissolved in DMSO according to an exemplary embodiment of the present invention.

FIG. 1 shows a solid state of the G58 pigment before the reaction according to Experimental Example 1, and FIG. 2 is an image of a state in which the G58 pigment is dissolved in DMSO before the reaction. FIG. 3 shows a solid state of a compound of Chemical Formula 1-1 prepared by the reaction, and FIG. 4 is an image of a state in which a compound of Chemical Formula 1-1 prepared by the reaction is dissolved in DMSO.

Referring to FIG. 1 and FIG. 2, it was confirmed that the G58 pigment was green in a solid state and remained solids without dissolving in DMSO. However, referring to FIG. 3 and FIG. 4, it was confirmed that the compound of Chemical Formula 1-1, in which the G58 pigment was modified with ethylene glycol as described above, was blue-green in a solid state, and was soluble in DMSO.

Experimental Example 2: Preparing a Compound of Chemical Formula 1-2

Anhydrous potassium carbonate (2.1 eq.) and polyvinyl alcohol (PVA) (2.5 eq.) were added to a 250 mL round-bottomed flask and stirred for 10 min with a G58 pigment (1.0 eq., based on the subunit) in 50° C. DMSO (50 mL), and then further stirred for 10 min. After confirming that the green particles of the G58 pigment were uniformly dispersed throughout the solution, the reaction proceeded at 110° C. under a $N_2$ atmosphere. As the reaction progressed, the particles changed from a green color to a blue-green color. The solution was stirred overnight to sufficiently substitute the β-site (peripheral position) substituent of the G58 pigment with PVA. The unreacted G58 pigment was removed through a filter, and water and ethyl ether were added thereto, so that a PVA-bound G58 dye was extracted by the organic solvent. The water was removed with anhydrous magnesium sulfate, and the solvent was removed by a rotary evaporator to obtain a blue-green color solid.

Figure 5:
FIG. 5 is an image of a state in which a compound of Chemical Formula 1-2 is dissolved in DMSO according to an exemplary embodiment of the present invention.

FIG. 5 is an image of a state in which a compound of Chemical Formula 1-2 prepared by the reaction according to Experimental Example 2 is dissolved in DMSO. As in Experimental Example 1, a blue-green solid was obtained and confirmed to be well soluble in DMSO.

Comparative Example 1: Preparing a Compound in which G58 is Non-Covalently Bonded with Ethylene Glycol Ethylene glycol (2.5 eq.) was added to a 20 mL glass bottle and stirred for 10 min with a G58 pigment (1.0 eq., based on the subunit) in 50° C. DMSO (5 mL), and then further stirred for 10 min. The solution was stirred overnight to sufficiently adsorb ethylene glycol to G58 particles. DMSO (10.0 mL) was further added thereto, and it was further stirred at room temperature for 10 min and then allowed to stand for 1 h to partially recover colored portions.

Comparative Example 2: Preparing a Compound in which G58 is Non-Covalently Bonded with Polyvinyl Alcohol PVA (2.5 eq.) was added to a 20 mL glass bottle and stirred for 10 min with a G58 pigment (1.0 eq., based on the subunit) in 50° C. DMSO (5 mL), and then further stirred for 10 min. The solution was stirred overnight to sufficiently adsorb PVA to G58 particles. DMSO (10.0 mL) was further added thereto, and it was further stirred at room temperature for 10 min and then allowed to stand for 1 h to recover a small amount of a colored and not precipitated upper layer.

As demonstrated in Comparative Examples 1 and 2, when the G58 pigment is simply mixed with ethylene glycol or PVA, particles of the G58 pigment can be precipitated without being well dispersed in an organic solvent such as DMSO.

Figure 6:
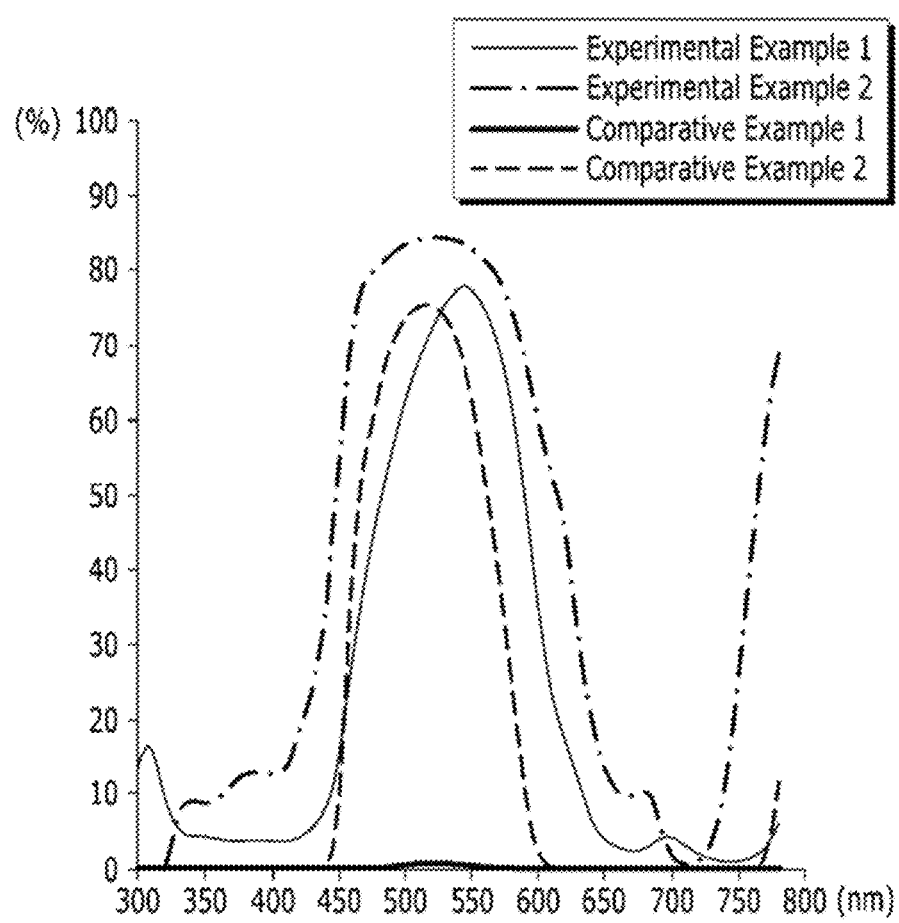
FIG. 6 shows transmittance spectrums regarding the compounds of Experimental Examples 1 and 2 according to an exemplary embodiment of the present invention and Comparative Examples 1 and 2.

The transmittance spectrums of the compounds prepared in Comparative Example 1 and Comparative Example 2 and the compounds prepared in Experimental Example 1 and Experimental Example 2 were measured and are shown in FIG. 6.

In Experimental Example 2, it was confirmed that the peak of the spectrum shifted to a relatively higher wavelength as compared with the spectrum of Comparative Example 2, the height of the peak was higher, and the upper portion of the peak was flat.

Referring to FIG. 6, in Experimental Example 1 in which the G58 pigment was covalently bonded with ethylene glycol, the peak of the spectrum was shown higher compared with the spectrum of the material prepared in Comparative Example 1. And in Experimental Example 2 in which the G58 pigment was covalently bonded to PVA, it could be confirmed that the peak of the spectrum shifted to a relatively higher wavelength, the height of the peak was higher, and the upper portion of the peak was flat, as compared with the spectrum of the material prepared in Comparative Example 2.

In the case of the compound of Comparative Example 1 (where the G58 pigment is not covalently bonded with ethylene glycol), the transmittance was almost not exhibited in the entire wavelength. However, in Experimental Example 1 in which G58 pigment was covalently bonded with ethylene glycol, the transmittance was exhibited in a wide range.

Comparing the compound of Comparative Example 2 (where the G58 pigment is not covalently bonded with PVA) and the compound of Experimental Example 2 (where the G58 pigment is covalently bonded with PVA), in the case of Experimental Example 2, it could be confirmed that the height of the peak of the transmittance is high, and the peak is close to the ideal rectangular shape.

Figure 7:
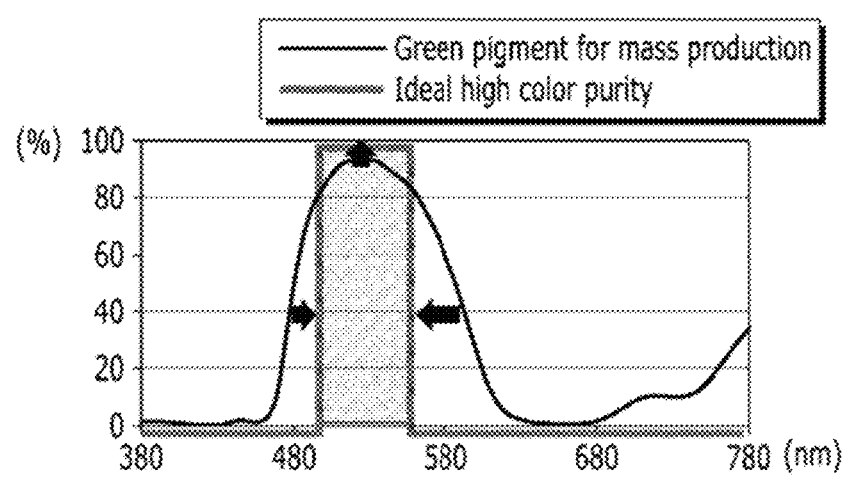
FIG. 7 shows a transmittance spectrum of a typical green pigment and the transmittance spectrum of an ideal green dye having high color purity.

To maintain the transmittance at a high level while the dye has high color purity, it is preferable that the width of the peak in the transmittance spectrum graph is narrow and the top portion of the peak is flat. FIG. 7 shows the transmittance spectrum of a pigment showing ordinary green used for mass production and the transmittance spectrum of green having ideal high color purity. The high color purity and the transmittance are inverse to each other, such that when the color purity is high, the transmittance decreases. This is because the width of the peak should be narrowed to increase the color purity, but the total transmittance is proportional to the area of the peak, and the area of the peak decreases as the width of the peak narrows.

To solve the above described problem, it is preferable that the top of the peak of the spectrum is flattened and the width of the peak is narrowed, as shown in FIG. 7. That is, the transmittance reduction caused by the narrowing of the peak is compensated for by making the entire peak have a rectangular shape while flattening the top of the peak.

As can be seen in FIG. 6, in the dye formed by modifying the G58 pigment according to an exemplary embodiment of the present invention, the transmittance spectrum shows that even though the width of the peak is narrowed, the height of the transmittance peak is increased and the peak top is flattened so that the transmittance can be maintained.

Figure 8:
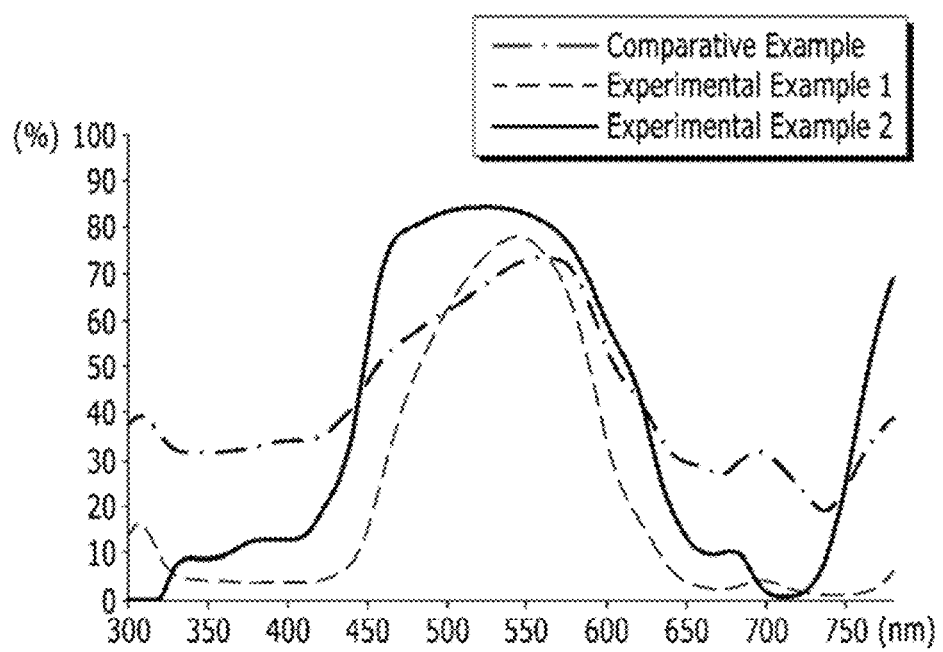
FIG. 8 shows transmittance spectrums of the dye according to an exemplary embodiment of the present invention and the dye according to a comparative example.

FIG. 8 shows the transmittance spectrum of the dye according to an exemplary embodiment of the present invention and the transmittance spectrum of the dye according to a comparative example of the present invention. Referring to FIG. 8, it can be confirmed that Experimental Example 1, in which the G58 pigment is modified by ethylene glycol, and Experimental Example 2, in which the G58 pigment is modified by PVA, show that the peaks of the transmittance spectrums are higher and the tops of the peaks are flat compared with the transmittance spectrum of Comparative Example, in which the G58 pigment is unmodified.

In the dye represented by Chemical Formula 1 according to an exemplary embodiment of the present invention, the G58 pigment is modified such that the top of the peak of the transmittance spectrum becomes flat, and the height of the peak increases. Therefore, the transmittance can be enhanced while increasing the color purity.

Hereinafter, the dye composition including the dye according to an exemplary embodiment of the present invention will be described.

The dye composition according to an exemplary embodiment of the present invention may include a dye including a compound represented by the following Chemical Formula 1, a yellow dye, and a cyan dye.

[Chemical Formula 1]

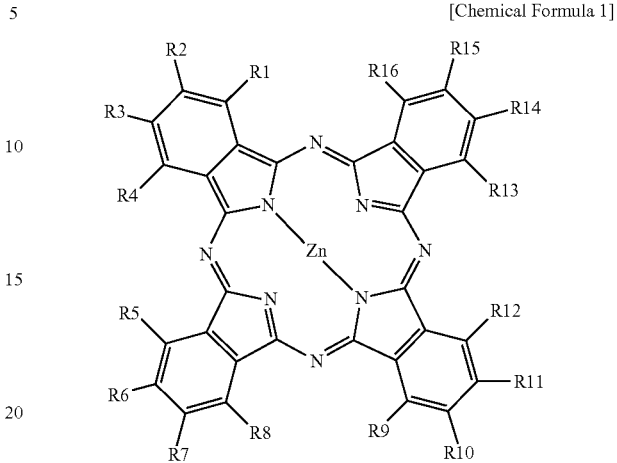

In Chemical Formula 1, R1, R4, R5, R8, R9, R12, R13, and R16 are each independently Br or Cl, R2, R3, R6, R7, R10, R11, R14, and R15 are each independently any one of a group including Br, Cl, and a hydroxyl group, a group including an —N(H)n group, and a group including an —SH group, n is 1 to 3, and at least one of R2, R3, R6, R7, R10, R11, R14, and R15 is any one of a group including a hydroxyl group, a group including an —N(H)n group, and a group including an —SH group.

The above described dye represented by Chemical Formula 1 may include other metals besides Zn. The dye according to an exemplary embodiment of the present invention may include a compound represented by the following Chemical Formula 1A.

[Chemical Formula 1A]

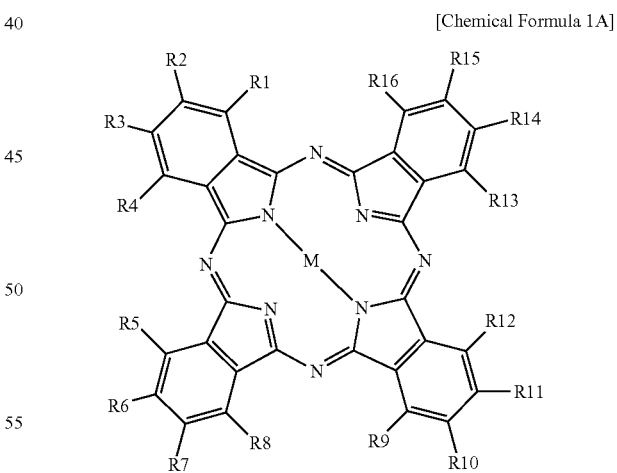

In Chemical Formula 1A, R1 to R16 are as defined in Chemical Formula 1. M is one of Fe, Co, Ni, Cu, Zn, and Mg. The —N(H)$_n$ group described above for Chemical Formula 1 may include, for example, an —NH$_2$ group, an —NH— group, and an =NH group, as well as protonated —N$^+$H$_3$, —N$^+$H$_2$—, and =N$^+$H$_2$— groups.

In the dye composition according to an exemplary embodiment of the present invention, the content of the yellow dye may be about 5 wt % to 15 wt %, the content of the cyan dye may be about 0.2 wt % to 1 wt %, and the dye including the compound represented by Chemical Formula 1 or Chemical Formula 1A may be included so that the total content is 100 wt %.

In the entire dye composition, the sum of the contents of the yellow dye and the cyan dye may be between about 5.2 wt % and 16 wt %, and in the about 5.2 wt % to 16 wt % of the entire dye composition, the weight ratio of the yellow dye and the cyan dye may be about 1:75 to 1:5.

In an exemplary embodiment of the present invention, the dye composition may include the dye including the compound represented by Chemical Formula 1 or 1A, a yellow pigment, and a cyan pigment. In this case, contents of the yellow pigment and the content of the cyan pigment may be the same as the contents of the yellow dye and the cyan dye described above. The detailed description regarding the same constituent elements is omitted.

The compound of Chemical Formula 1 may be a compound represented by the following Chemical Formula 1-1 or a compound represented by the following Chemical Formula 1-2.

In an exemplary embodiment of the present invention, the compound of Chemical Formula 1A in the dye composition may be a compound represented by the following Chemical Formula 1A-1 or a compound represented by the following Chemical Formula 1A-2.

[Chemical Formula 1-1]

[Chemical Formula 1A-1]

[Chemical Formula 1A-2]

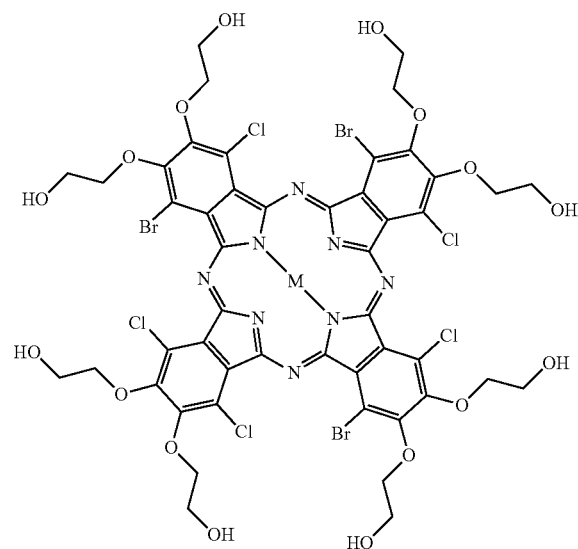

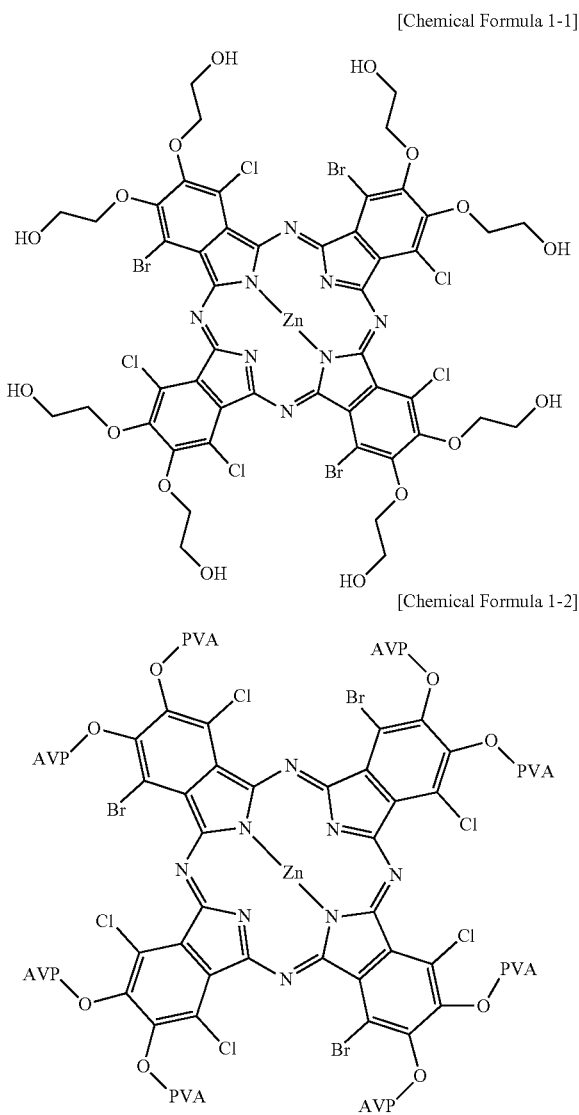

[Chemical Formula 1-2]

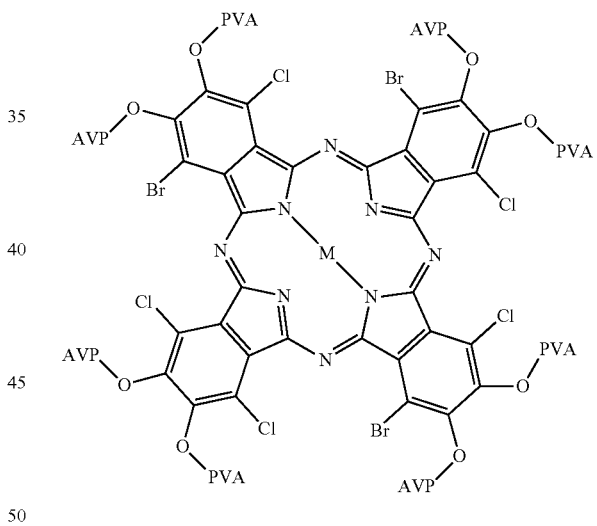

In Chemical Formulae 1A-1 and 1A-2, M is one of Fe, Co, Ni, Cu, Zn, and Mg as defined in Chemical Formula 1A.

The dye composition according to an exemplary embodiment of the present invention includes a yellow dye and a cyan dye in addition to the dye according to an exemplary embodiment of the present invention described above. Alternatively, a yellow pigment and a cyan pigment may be included in addition to the dye according to the exemplary embodiment of the present invention. By including such dye or pigment, the transmittance of the wavelength not corresponding to the green region in the green dye is lowered and the shape of the transmittance spectrum of the entire dye composition is made close to the ideal high purity green transmittance spectrum as shown in FIG. 7.

Figure 9:
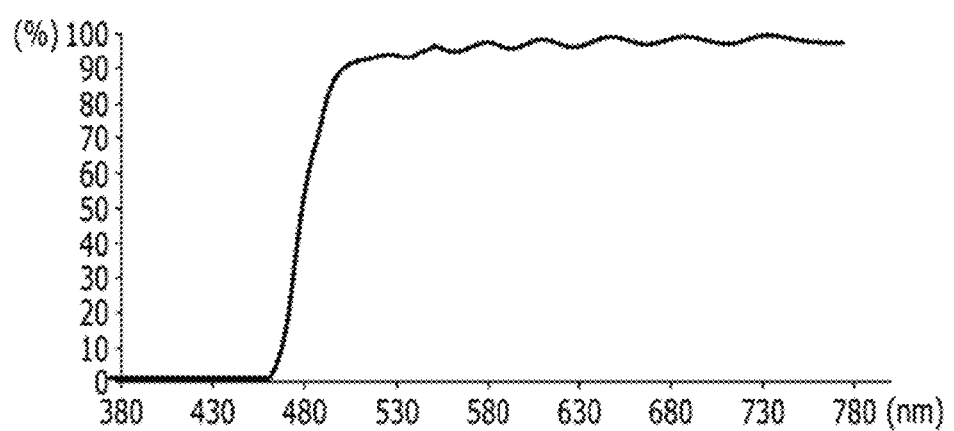
FIG. 9 shows a transmittance spectrum of the yellow dye included in the dye composition according to an exemplary embodiment of the present invention.

FIG. 9 shows the transmittance spectrum of the yellow dye included in the dye composition according to an exemplary embodiment of the present invention. Referring to FIG. 9, the yellow dye according to the present exemplary embodiment may have transmittance of less than about 1% for a wavelength at about 460 nm and below. As shown in FIG. 9, the low transmittance is shown between about 380 nm to about 460 nm. In the exemplary embodiment of the present invention, a Y138, Y139, Y150, or Y185 dye, which is commercially available, may be used as the yellow dye, but the present invention is not limited thereto.

Figure 10:
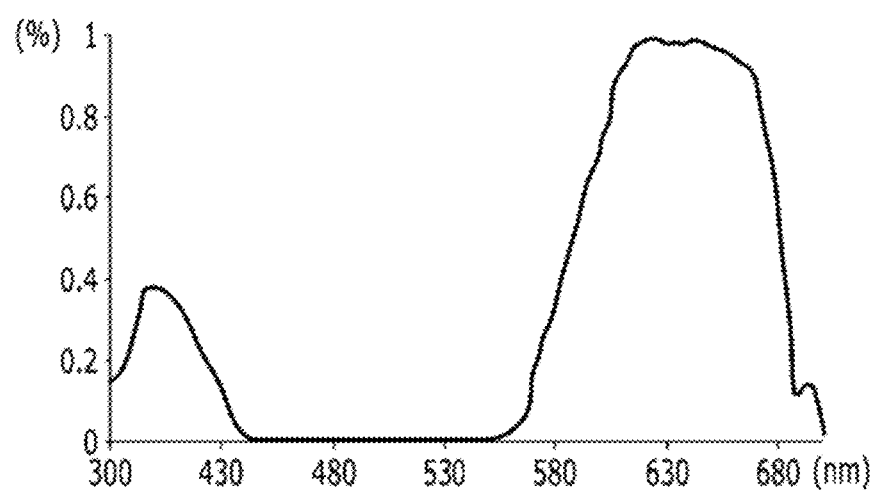
FIG. 10 shows a transmittance spectrum of the cyan dye included in the dye composition according to an exemplary embodiment of the present invention.

FIG. 10 shows the transmittance spectrum of the cyan dye included in the dye composition according to an exemplary embodiment of the present invention. The cyan dye having the transmittance spectrum as shown FIG. 10 may be included in the dye composition according to the exemplary embodiment of the present invention. Alternatively, a cyan dye having an absorption central wavelength of about 635 nm to 665 nm may be included.

The cyan dye used in the exemplary embodiment of the present invention may be a squaraine dye, but the present invention is not limited thereto.

Figure 11:
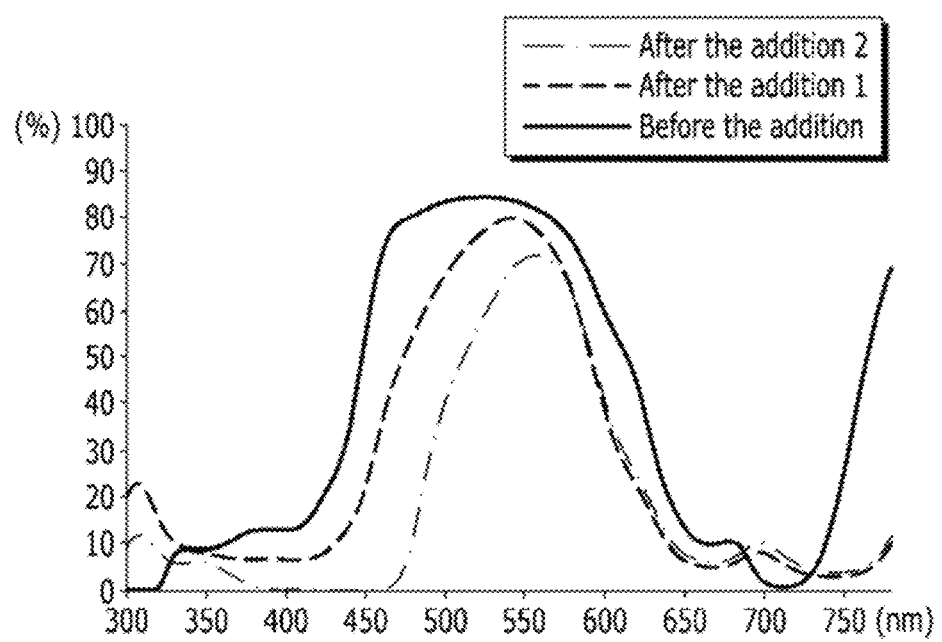
FIG. 11 shows a change of the transmittance spectrum of the dye composition according to the yellow dye content according to an exemplary embodiment of the present invention.

By including the yellow dye and the cyan dye having such transmittance spectrums, the transmittance spectrum of the dye composition of the present invention may be ideally adjusted. That is, the transmittance of the portion not corresponding to green in the transmittance spectrum becomes close to 0% due to the mixing of the yellow dye and the cyan dye. Accordingly, the width of the transmittance spectrum of the finally prepared dye composition is narrowed. FIG. 11 shows the change of the transmittance spectrum of the dye composition according to the yellow dye content. Referring to FIG. 11, before the addition of the yellow dye, the peak of the transmittance spectrum was wide. However, it was confirmed that the more the yellow dye was added, the narrower the width of the peak of the transmittance spectrum became. In FIG. 11, "After the addition 2" includes more yellow dye than "After the addition 1", and the width of the peak of "After the addition 2" is narrower.

When the cyan dye is further added to such a dye composition described above, the transmittance spectrum of the green dye composition approaches the ideal shape shown in FIG. 7.

Figure 12:
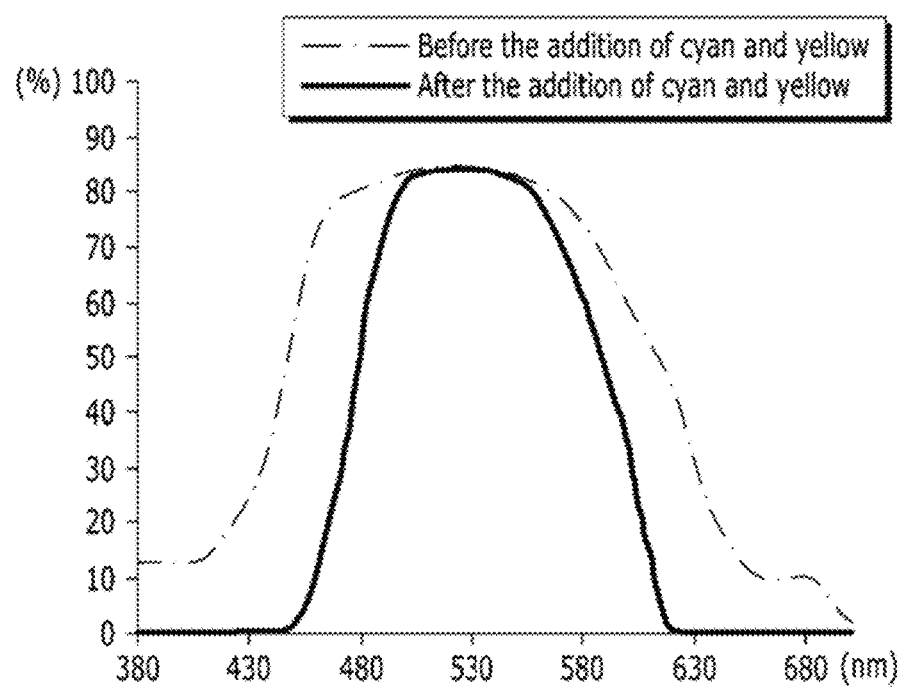
FIG. 12 shows transmittance spectrums of the dye composition not including the yellow dye and the cyan dye, and the dye composition including the yellow dye and the cyan dye according to an exemplary embodiment of the present invention.

FIG. 12 shows the transmittance spectrum of the dye composition not including the yellow dye and the cyan dye, and the transmittance spectrum of the dye composition including the yellow dye and the cyan dye according to an exemplary embodiment of the present invention.

Referring to FIG. 12, in the dye composition according to the exemplary embodiment of the present invention, the full width at half maximum of the transmittance peak decreased while the height of the transmittance peak was maintained. That is, as the exemplary embodiment of the present invention, the center of the transmittance peak of the dye composition, in which the yellow dye and the cyan dye are mixed, is about 530 nm, and the full width at half maximum may be about 100 nm with two sides of the spectrum about ±50 nm with respect to the center of the peak. The full width at half maximum (FWHM) means a width at half height of a peak in the spectrum, and a narrower full width at half maximum means that the peak has a sharp-pointed shape.

In conventional dye compositions without yellow or cyan dyes, the peak was formed mostly in the range of about 430 nm to 630 nm, and the transmittance was exhibited at about 10% even in the wavelength area outside of this range. Such a wide peak with some transmittance outside of the major peak range may cause a decrease in green color purity. However, in the dye composition according to the exemplary embodiment of the present invention as shown FIG. 12, the peak was formed in the range of about 440 nm to 600 nm. Further, the transmittance outside of the major peak range, e.g., about 440 nm or less or about 600 nm or greater, was less than 1%, and close to 0%, at least within the wavelength range between about 380 run and about 700 nm shown in FIG. 12. Therefore, the dye composition according to the exemplary embodiment of the present invention can emit green light having high color purity since the peak is narrow and the transmittance outside of the peak region is close to 0%. In addition, although the width of the peak is narrowed, the transmittance reduction is not large, because the top of the peak is flattened while maintaining the height of the transmittance peak.

As described above, in the dye composition according to the exemplary embodiment of the present invention, the transmittance peak approaches the ideal rectangular shape by mixing the modified dye with the yellow dye and the cyan dye at a certain ratio. The top of the peak of the transmittance spectrum is flat, but the full width at half maximum is reduced to about 100 nm. Accordingly, although the color purity of green is increased by decreasing the full width at half maximum, the transmittance reduction is not large because the top of the peak of the transmittance spectrum is flat. Therefore, the transmittance can be maintained at a high level while exhibiting green with high color purity.

The green dye according to the exemplary embodiment of the present invention described above can be applied to a color filter of a display device, and is suitable for emitting deep green in a display device when applied to a color filter.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A dye comprising a compound represented by the following Chemical Formula 1:

[Chemical Formula 1]

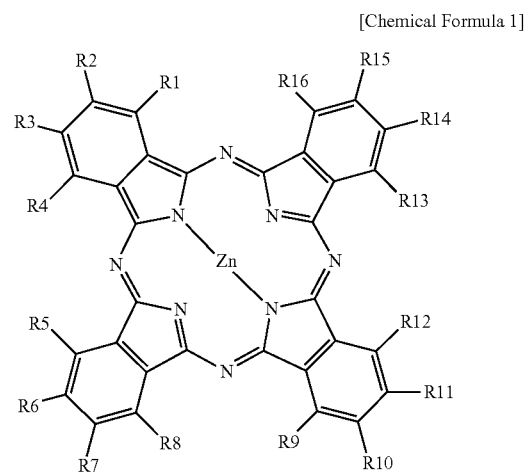

wherein, in Chemical Formula 1,
R1, R4, R5, R8, R9, R12, R13, and R16 are each independently Br or Cl,
R2, R3, R6, R7, R10, R11, R14, and R15 are each independently any one of a group including Br, Cl, and a hydroxyl group, and a group including an —SH group, and at least one of the R2, R3, R6, R7, R10, R11, R14, and R15 is any one of ethylene glycol, polyvinyl alcohol, and a group including an —SH group.

2. The dye of claim 1, wherein
the compound of Chemical Formula 1 comprises a compound represented by the following Chemical Formula 1-1:

[Chemical Formula 1-1]

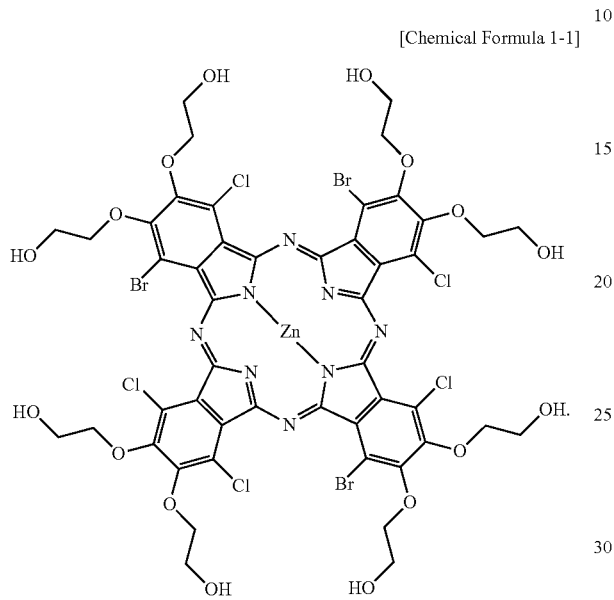

3. The dye of claim 1, wherein
the compound of Chemical Formula 1 comprises a compound represented by the following Chemical Formula 1-2:

[Chemical Formula 1-2]

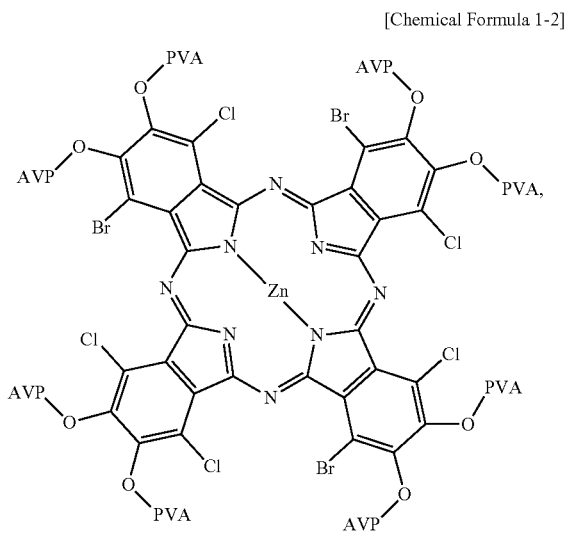

wherein PVA represents polyvinyl alcohol.

4. A dye composition comprising:
a dye comprising a compound represented by the following Chemical Formula 1;
a yellow dye or a yellow pigment; and
a cyan dye or a cyan pigment:

[Chemical Formula 1]

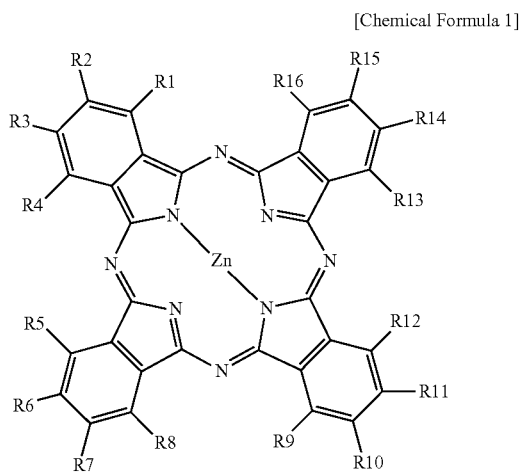

wherein, in Chemical Formula 1,
R1, R4, R5, R8, R9, R12, R13, and R16 are each independently Br or Cl,
R2, R3, R6, R7, R10, R11, R14, and R15 are each independently any one of a group including Br, Cl, and a hydroxyl group, a group including an —N(H)n group, and a group including an —SH group,
n is 1 to 3, and
at least one of the R2, R3, R6, R7, R10, R11, R14, and R15 is any one of a group including a hydroxyl group, a group including an —N(H)n group, and a group including an —SH group.

5. The dye composition of claim 4, wherein:
a content of the yellow dye is about 5 wt % to 15 wt %;
a content of the cyan dye is about 0.2 wt % to 1 wt %; and
the dye comprising the compound represented by Chemical Formula 1 is comprised by the dye composition so that total content of the dye composition is 100 wt %.

6. The dye composition of claim 4, wherein
the dye composition has a transmittance central wavelength of about 530 nm and a full width at half maximum (FWHM) of about 100 nm.

7. The dye composition of claim 4, wherein
the group including a hydroxyl group comprises ethylene glycol and polyvinyl alcohol.

8. The dye composition of claim 7, wherein
the compound of Chemical Formula 1 comprises a compound represented by the following Chemical Formula 1-1:

9. The dye composition of claim 7, wherein the compound of Chemical Formula 1 comprises a compound represented by the following Chemical Formula 1-2:

[Chemical Formula 1-1]

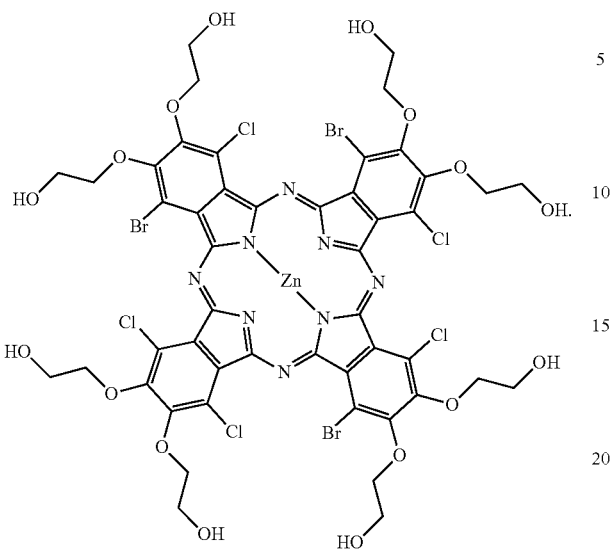

[Chemical Formula 1-2]

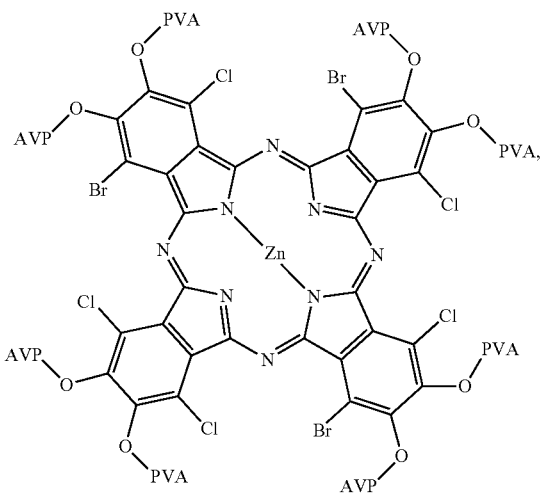

wherein PVA represents polyvinyl alcohol.

10. The dye composition of claim 4, wherein the cyan dye has an absorption central wavelength of about 635 nm to 665 nm.

11. The dye composition of claim 5, wherein the yellow dye has transmittance of less than 1% for a wavelength of about 460 nm or less.

12. The dye composition of claim 4, wherein the dye composition has transmittance of less than 1% for a wavelength of about 600 nm or greater.

13. The dye composition of claim 4, wherein the dye composition has transmittance of less than 1% for a wavelength of about 440 nm or less.

14. A dye composition for a color filter of a display device comprising a compound represented by the following Chemical Formula 1A:

[Chemical Formula 1A]

wherein, in Chemical Formula 1A,

R1, R4, R5, R8, R9, R12, R13, and R16 are each independently Br or Cl,

R2, R3, R6, R7, R10, R11, R14, and R15 are each independently any one of a group including Br, Cl, and a hydroxyl group, a group including an —NH$_2$ group, and an =NH group, and a group including an —SH group, at least one of the R2, R3, R6, R7, R10, R11, R14, and R15 is any one of a group including a hydroxyl group, a group including an —NH$_2$ group, and an =NH group, and a group including an —SH group, and M is one of Fe, Co, Ni, Cu, Zn, and Mg, wherein the group including a hydroxyl group comprises ethylene glycol and polyvinyl alcohol.

15. A dye composition for a color filter of a display device comprising a compound represented by the following Chemical Formula 1A-2:

[Chemical Formula 1A-2]

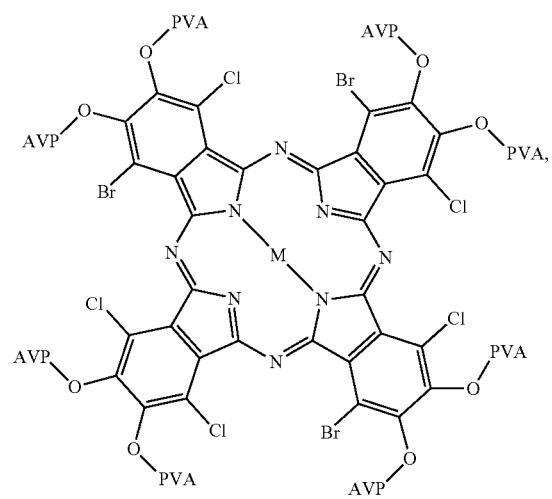

wherein PVA represents polyvinyl alcohol.

16. The dye composition of claim 14, further comprising a yellow dye having transmittance of less than 1% for a wavelength of about 460 nm or less.

17. The dye composition of claim 14, further comprising a cyan dye having an absorption in a range from about 635 nm to about 665 nm.

\* \* \* \* \*